(12) United States Patent
Seymour et al.

(10) Patent No.: US 8,744,852 B1
(45) Date of Patent: Jun. 3, 2014

(54) SPOKEN INTERFACES

(75) Inventors: Eric T. Seymour, San Jose, CA (US); Richard W. Fabrick, II, Campbell, CA (US); Patti P. Yeh, Cupertino, CA (US); John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 819 days.

(21) Appl. No.: 11/643,389

(22) Filed: Dec. 20, 2006

Related U.S. Application Data

(63) Continuation of application No. 10/956,720, filed on Oct. 1, 2004.

(51) Int. Cl.
*G10L 13/00* (2006.01)

(52) U.S. Cl.
USPC ............ 704/260; 704/258; 704/270; 704/271

(58) Field of Classification Search
USPC .................................. 704/258, 260, 270, 271
See application file for complete search history.

(56) References Cited

U.S. PATENT DOCUMENTS

| | | | |
|---|---|---|---|
| 4,332,464 A | 6/1982 | Bartulis et al. |
| 4,680,429 A | 7/1987 | Murdock et al. |
| 4,698,625 A | 10/1987 | McCaskill et al. |
| 4,755,811 A | 7/1988 | Slavin et al. |
| 4,790,028 A | 12/1988 | Ramage |
| 5,016,002 A | 5/1991 | Levanto |
| 5,027,110 A | 6/1991 | Chang et al. |
| 5,053,758 A | 10/1991 | Cornett et al. |
| 5,079,723 A | 1/1992 | Herceg et al. |
| 5,083,119 A | 1/1992 | Trevett et al. |
| 5,119,079 A | 6/1992 | Hube et al. |
| 5,201,034 A | 4/1993 | Matsuura et al. |
| 5,260,697 A | 11/1993 | Barrett et al. |
| 5,266,931 A | 11/1993 | Tanaka |
| 5,266,949 A | 11/1993 | Rossi |
| 5,326,270 A | 7/1994 | Ostby et al. |
| 5,335,276 A | 8/1994 | Thompson et al. |
| 5,341,293 A | 8/1994 | Vertelney et al. |

(Continued)

FOREIGN PATENT DOCUMENTS

| | | |
|---|---|---|
| EP | 0 057 514 | 8/1982 |
| EP | 0 283 995 | 9/1988 |

(Continued)

OTHER PUBLICATIONS

"Turn On and Use Magnifier", Microsoft, Available at http://microsoft.com/windowsxp/using/accessibility/magnifierturnon.mspx, Accessed on Jun. 6, 2009.

(Continued)

*Primary Examiner* — Leonard Saint Cyr
(74) *Attorney, Agent, or Firm* — Morrison & Foerster LLP

(57) ABSTRACT

A spoken interface is described for assisting a visually impaired user to obtain audible information and interact with elements displayed on a display screen. The spoken interface also enables access and control of other elements that are hidden by other windows. The interface receives user input data representing user inputs received by an input device and uses a movable selector to select an element of an application. The element selected by the selector may be either an editing type element or non-editing type element. The interface provides audio information regarding the selected editing or non-editing element and enables interaction with the selected element.

19 Claims, 14 Drawing Sheets

(56) References Cited

U.S. PATENT DOCUMENTS

| | | | |
|---|---|---|---|
| 5,341,466 A | 8/1994 | Perlin et al. | |
| 5,408,060 A | 4/1995 | Muurinen | |
| 5,422,656 A | 6/1995 | Allard et al. | |
| 5,459,488 A | 10/1995 | Geiser | |
| 5,463,725 A | 10/1995 | Henckel et al. | |
| 5,465,401 A | 11/1995 | Thompson | |
| 5,543,588 A | 8/1996 | Bisset et al. | |
| 5,543,897 A | 8/1996 | Altrieth, III | |
| 5,559,301 A | 9/1996 | Bryan, Jr. et al. | |
| 5,565,888 A | 10/1996 | Selker | |
| 5,568,536 A | 10/1996 | Tiller et al. | |
| 5,579,037 A | 11/1996 | Tahara et al. | |
| 5,615,384 A | 3/1997 | Allard et al. | |
| 5,638,523 A | 6/1997 | Mullet et al. | |
| 5,689,287 A | 11/1997 | Mackinlay et al. | |
| 5,699,082 A * | 12/1997 | Marks et al. | 345/157 |
| 5,736,974 A | 4/1998 | Selker | |
| 5,757,358 A | 5/1998 | Osga | |
| 5,815,142 A | 9/1998 | Allard et al. | |
| 5,825,349 A * | 10/1998 | Meier et al. | 345/684 |
| 5,877,751 A | 3/1999 | Kanemitsu et al. | |
| 5,920,327 A | 7/1999 | Seidensticker | |
| 5,926,769 A | 7/1999 | Valimaa et al. | |
| 5,943,043 A | 8/1999 | Furuhata et al. | |
| 5,956,021 A | 9/1999 | Kubota et al. | |
| 5,977,950 A | 11/1999 | Rhyne | |
| 5,982,352 A | 11/1999 | Pryor | |
| 5,999,169 A | 12/1999 | Lee | |
| 6,020,881 A | 2/2000 | Naughton et al. | |
| 6,054,990 A | 4/2000 | Tran | |
| 6,073,036 A | 6/2000 | Heikkinen et al. | |
| 6,097,391 A | 8/2000 | Wilcox | |
| 6,116,907 A | 9/2000 | Baker et al. | |
| 6,121,960 A | 9/2000 | Carroll et al. | |
| 6,144,377 A * | 11/2000 | Oppermann et al. | 715/744 |
| 6,157,935 A | 12/2000 | Tran et al. | |
| 6,173,194 B1 | 1/2001 | Vanttila | |
| 6,295,390 B1 | 9/2001 | Kobayashi et al. | |
| 6,377,928 B1 * | 4/2002 | Saxena et al. | 704/275 |
| 6,442,523 B1 | 8/2002 | Siegel | |
| 6,448,986 B1 | 9/2002 | Smith | |
| 6,564,186 B1 * | 5/2003 | Kiraly et al. | 704/260 |
| 6,591,379 B1 * | 7/2003 | LeVine et al. | 714/38 |
| 6,615,176 B2 | 9/2003 | Lewis et al. | |
| 6,684,376 B1 * | 1/2004 | Kerzman et al. | 716/124 |
| 6,728,675 B1 * | 4/2004 | Maddalozzo et al. | 704/275 |
| 6,832,381 B1 * | 12/2004 | Mathur et al. | 719/328 |
| 6,948,094 B2 | 9/2005 | Schultz et al. | |
| 7,051,096 B1 | 5/2006 | Krawiec et al. | |
| 7,137,126 B1 * | 11/2006 | Coffman et al. | 719/328 |
| 2001/0020259 A1 | 9/2001 | Sekiguchi et al. | 710/260 |
| 2002/0069220 A1 | 6/2002 | Tran | |
| 2002/0122053 A1 | 9/2002 | Dutta et al. | |
| 2002/0138616 A1 * | 9/2002 | Basson et al. | 709/225 |
| 2002/0152255 A1 * | 10/2002 | Smith et al. | 709/102 |
| 2003/0061317 A1 * | 3/2003 | Brown et al. | 709/221 |
| 2003/0090474 A1 | 5/2003 | Schaefer | |
| 2003/0164848 A1 | 9/2003 | Dutta et al. | |
| 2003/0210266 A1 | 11/2003 | Cragun et al. | |
| 2003/0214519 A1 * | 11/2003 | Smith et al. | 345/660 |
| 2004/0056899 A1 * | 3/2004 | Sinclair et al. | 345/800 |
| 2004/0064593 A1 | 4/2004 | Sinclair et al. | |
| 2004/0070612 A1 * | 4/2004 | Sinclair et al. | 345/762 |
| 2004/0111332 A1 | 6/2004 | Baar et al. | |
| 2004/0186713 A1 | 9/2004 | Gomas et al. | |
| 2004/0252119 A1 | 12/2004 | Hunleth et al. | |
| 2005/0071165 A1 * | 3/2005 | Hofstader et al. | 704/270.1 |
| 2005/0144070 A1 * | 6/2005 | Cheshire | 705/14 |

FOREIGN PATENT DOCUMENTS

| | | |
|---|---|---|
| EP | 0 476 972 A2 | 3/1992 |
| EP | 0 476 972 B1 | 3/1992 |
| EP | 0 575 146 | 12/1992 |
| EP | 0 609 030 B1 | 8/1994 |
| EP | 0 651 543 A2 | 5/1995 |
| EP | 0 651 543 B1 | 5/1995 |
| JP | 57-041731 | 3/1982 |
| JP | 59-057336 | 4/1984 |
| JP | 02-153415 | 6/1990 |
| JP | 03-113578 | 5/1991 |
| JP | 05-165459 | 7/1993 |
| JP | 06-274586 | 9/1994 |
| JP | 06-332617 | 12/1994 |
| JP | 07-320051 | 12/1995 |
| JP | 07-320079 | 12/1995 |
| JP | 08-185265 | 7/1996 |
| JP | 08-227341 | 9/1996 |
| WO | WO 94/29788 | 12/1994 |
| WO | WO 98/09270 | 3/1998 |

OTHER PUBLICATIONS

Corr, Paul, "Macintosh Utilities for Special Needs Users", downloaded from the Internet at htt://homepage.mac.com/corrp/macsupt/columns/specneeds.html, originally written Feb. 1994 (content updated Sep. 19, 1999), pp. 1-4.

"Lens—Magnifying Glass 1.5", downloaded from the Internet at http://download.com/3000-2437-10262078.html?tag=1st-0-1, published by ABF Software (Feb. 11, 2004), 1 page.

Microsoft Windows XP, Magnifier Utility, Released on Oct. 25, 2001, See included Screen Shots 1 and 2.

Zipnick et al., U.S. Appl. No. 10/859,661, filed Jun. 2, 2004.

Apple Inc. video clip titled "Touchscreen Keyboards" by Andrew Sears and Ben Shneiderman, Human-Computer Interaction Laboratory, on a CD (Apr. 1991).

Apple Inc. video clip titled "2 Techniques for Improved HC Interaction: Toolglass & Magic Lenses: The See-Through Interface" by Baudel, Thomas et al., CHI '94 Video Program, on a CD (1994).

Apple Inc. video clip titled "Exploring Large Tables with the Table Lens," by Rao, Ramana and Card, Stuart K., Xerox Corp., on a CD (1994).

Apple Inc. video clip titled "Browing Graphs Using a Fisheye View" by Marc H. Brown et al., Systems Research Center, CHI '92 Continued Proceedings, on a CD (1992).

Apple Inc. video clip titled "The DragMag Image Magnifier Prototype I," by Ware, Colin and Lewis, Marlon, on a CD (1995). Applicant is not certain about the date for the video clip. The 1995 date is provided based on the "The DragMag Image Magnifier" publication by the same authors cited by the applicant in the IDS filed on Sep. 30, 2010.

Apple Inc. video clip titled "Visualizing Large Trees Using the Hyperbolic Browser" by Lamping, John and Rao, Ramana, MIT Media Library, on a CD (1995).

Ahlberg, Christopher and Shneiderman, Ben "The Alphaslider: A Compact and Rapid Selector," Proceedings Conference on Human Factors in Computing Systems, Apr. 24-28, 1994, pp. 365-371, ACM 1994, Denver.

Ahlberg, Christopher and Shneiderman, Ben "Visual Information Seeking: Tight Coupling of Dynamic Query Filters with Starfield Displays," Proceedings Conference on Human Factors in Computing Systems, Apr. 24-28, 1994, pp. 313-317 & 479-480, Boston.

Ahlstrom, Bengt et al., "Overcoming Touchscreen User Fatigue by Workplace Design," SIGCHI on Human Factors in Computer Systems, 1992, p. 101-102.

Baeza-Yates, Ricardo "Visualization of Large Answers in Text Databases," 1996, pp. 101-107, ACM 0-89791-834-7/96/05.

Barthel, Brea "Information Access for Visually Impaired Persons: Do We Still Keep a "Document" in a "Documentation"?," IEEE 1995, pp. 62-66, IEEE #0-7803-2957-0/95.

Bederson, Benjamin B. and Hollan, James D. "Pad++: A Zooming Graphical User Interface for Exploring Alternate Interface Physics," ACM 1994, Nov. 2-4, 1994, pp. 17-26, ACM 0-89791-657-3/94/0011.

Bederson, Benjamin B. and Shneiderman, Ben "The Craft of Information Visualization—Readings and Reflections," 2003, entire book, Morgan Kaufman Publishers, San Francisco, ISBN 1558609156 (divided in four (4) parts for uploading purposes).

(56) References Cited

OTHER PUBLICATIONS

Benel, Russell A. and Stanton, Brian C. "Optimal Size and Spacing of Touchscreen Input Areas," Human-Computer Interaction—INTERACT '87, 1987, pp. 581-585, Elsevier Science Publishers B.V., North-Holland.

Beringer, Dennis B. "Target Size, Location, Sampling Point and Instructional Set: More Effects on Touch Panel Operation," Proceedings of the Human Factors Society 34th Annual Meeting, 1990, pp. 375-379.

Beringer, Dennis B. and Bowman, Mary James "Operator Behavioral Biases Using High-Resolution Touch Input Devices," Proceedings of the Human Factors Society 33rd Annual Meeting, 1989, pp. 320-322.

Bernabei, Antonio et al., "Graphical I/O Devices for Medical Users," Engineering in Medicine and Biology Society, Proceedings of the Annual International Conference of the IEEE, Oct. 29-Nov. 1, 1992, pp. 834-836, IEEE #0-7803-0785-02/92.

Bier, Eric A. et al., "Toolglass and Magic Lenses: The See-Through Interface," 1993, pp. 73-80, AMC #0-89791-601-8/93/008.

Brown, Marc H. et al., "Browsing Graphs Using a Fisheeye View," INTERCHI '93, Apr. 24-29, 1993, p. 516, ACM #0-89791-575-5/93/0004/0516.

Burger, Dominique "Improved Access to Computers for the Visually Handicapped: New Prospects and Principles," IEEE Transactions on Rehabilitation Engineering, Sep. 1994, pp. 111-118, vol. 2—No. 3.

Card, Stuart K. et al., "Readings in Information Visualization Using Vision to Think," 1999, entire book, Morgan Kaufman Publishers (divided in seven (7) parts for uploading purposes).

Carpendale, M. Sheelagh T et al., "Making Distortions Comprehensible," 1997, pp. 36-45, IEEE #1049-2615/97.

Carpendale, M. Sheelagh T. et al., "3-Dimensional Pliable Surfaces: For the Effective Presentation of Visual Information," 1995, 11 pgs.

Carpendale, M. Sheelagh T. et al., "Extending Distortion Viewing from 2D to 3D," Jul./Aug. 1997, pp. 42-51, IEEE 0272-1716/97.

Degani, Asaf et al., "Soft' Controls for Hard Displays: Still a Challenge," Proceedings of the Human Factors Society 36th Annual Meeting, 1992, pp. 52-56.

Eslambolchilar, Parisa and Murray-Smith, Roderick "Making Sense of Fisheye Views," Second Dynamics and Interaction Workshop at University of Glasgow, Aug. 2005, 8 pgs.

Furnas, George W. "Effective View Navigation," CHI '97, Mar. 22-27, 1997, 8 pgs., Atlanta, ACM 0-89791-802-9/97/03.

Furnas, George W. "Generalized Fisheye Views," CHI '86 Proceedings, Apr. 1986, pp. 16-23, ACM 0-89791-180-6/86/0400-0016.

Furnas, George W. "The Fisheye Calendar System," Bellcore Technical Memorandum, Nov. 19, 1991, pp. 1-9.

Furnas, George W. and Bederson, Benjamin B. "Space-Scale Diagrams: Understanding Multiscale Interfaces," CHI '95 Proceedings, 1995, 12 pgs.

Greenberg, Saul "A Fisheye Text Editor for Relaxed-WYSIWIS Groupware," CHI '96, Apr. 13-18, Vancoucer, BC Canada 1996, pp. 212-213, ACM 0-89791-832-0/96/04.

Hinkley, Ken et al., "A Survey of Design Issues in Spatial Input," UIST '94, Nov. 2-4, 1994, pp. 213-222, ACM 0-89791-657-3/94/0011.

Johnson, Jeff A. "A Comparison of User Interfaces for Panning on a Touch-Controlled Display," CHI '95 Proceedings, 1995, 8 pgs.

Kamba, Tomonari et al., "Using Small Screen Space More Efficiently," CHI '96, Apr. 13-18, 1996, pp. 383-390, Vancouver, BC Canada, AMC 0-89791-777-4/96/04.

Keahey, Alan T. and Robertson, Edward L. "Techniques for Non-Linear Magnification Transformations," Proceedings of the 1996 IEEE Symposium on Information Visualization (INFOIVS '96), 1996, pp. 38-45, IEEE 0/8186-7668-X/96.

Keahey, T. Alan and Marley, Julianne "Viewing Text with Non-Linear Magnification: An Experimental Study," Apr. 24, 1996, pp. 1-9.

Keahey, T. Alan and Robertson, Edward L. "Nonlinear Magnification Fields," 1997, pp. 1-11.

Keahey, T. Alan and Robertson, Edward L., "Non-Linear Image Magnification," Apr. 24, 1996, pp. 1-12.

Kline, Richard L. and Glinert, Ephraim P. "Improving GUI Accessibility for People with Low Vision," Proceedings of the SIGCHI Conference on Human Factors in Computing Systems, May 7-11, 1995, pp. 114-121, Denver.

Kline, Richard L. and Glinert, Ephraim P. "UnWindows 1.0: X Windows Tools for Low Vision Users," 1994, pp. 1-5.

Lamping, John and Rao, Ramana "Laying Out and Visualizing Large Trees Using a Hyperbolic Space," UIST '94, Nov. 2-4, 1994, pp. 13-14, Marina del Rey, ACM #0-89791-573-3/94/0011.

Lazzaro, Joseph J. "Adapting Desktop Computers to Meet the Needs of Disabled Workers is Easier Than you Might Think," Computers for the Disabled—BYTE Magazine, Jun. 1993, 5 pgs., #144, McGraw Hill, Inc.

Leahy, Michael and Hix, Deborah "Effect of Touch Screen Target Location on User Accuracy," Proceedings of the Human Factors Society 34th Annual Meeting, 1990, pp. 370-374.

Leung, Y.K. and Apperley, M.D., "A Review and Taxonomy of Distortion-Oriented Presentation Techniques," ACM Transactions on Computer-Human Interaction, Jun. 1994, pp. 126-160, vol. 1—No. 2, ACM #1073-0516/94/0600-0126.

Lieberman, Henry "A Multi-Scale, Multi-Layer, Translucent Virtual Space," 1997, pp. 124-131, IEEE #0-8186-8076-8/97.

Lieberman, Henry "Powers of Ten Thousand: Navigating in Large Information Spaces," Nov. 2-4, 1994, pp. 15-16, Marina del Rey, ACM #0-89791-657-3/94/0011.

Mackenzie, I. Scott et al., "Alphanumeric Entry on Pen-Based Computers," Int. J. Human-Computer Studies, 1994, pp. 775-792, Issue 41, #1071-5819/94/110775.

Mackinlay, Jock D. et al., "The Perspective Wall: Detail and Context Smoothly Integrated," 1991, pp. 173-179, ACM, ACM #0-89791-383-3/91/0004/0173.

Magnification Technology, Technology for Students Who are Visually Impaired, 1994, 7pgs., NCIP Staff, http://www2.edc.org/ncip/library/vi/magnifi.htm.

Milner, N.P. "A Review of Human Performance and Preferences with Different Input Devices to Computer Systems," Conference of the British Computer Society Human-Computer Interaction Specialist Group, Sep. 5-9, 1988. pp. 341-362, Manchester, U.K.

Noik, Emanuel G. "Layout-Independent Fisheye Views of Nested Graphs," 1993, pp. 336-341, IEEE Xplore, IEEE #1049-2615/93.

Okazaki, T. and Kawano, H. "Multi-Fisheye Transformation Method for Large-Scale Network Maps." 1995, pp. 495-500, vol. 44—Issue 6, IEEE Japan, ISSN #0915-2326.

Phillipps, Ben "Touchscreens are Changing the Face of Compueters—Today's Users Have Five Types of Touchscreens to Choose from, Each with its Own Unique Characteristics," Electronic Products, Nov. 1994, pp. 63-70.

Pickering, J.A. "Touch-Sensitive Screens: The Technologies and their Application," Int. J. Man-Machine Studies, 1986, pp. 249-269, Issue 25, Academic Press Inc., London, #0020-7373/86/090249.

Plaisant, Catherine and Sears, Andrew "Touchscreen Interfaces for Alphanumeric Data Entry," Human Factors Perspectives on Human-Computer Interaction, Proceedings of the Human Factors Society 36th Annual Meeting, 1992, pp. 293-297, vol. 1.

Plaisant, Catherine and Wallace, Daniel "Touchscreen Toggle Design," CHI '92, May 3-7, 1992, pp. 667-668.

Potter, Richard et al., "An Experimental Evaluation of Three Touch Screen Strategies within a Hypertext Database," International Journal of Human-Computer Interaction, 1989, pp. 41-52, vol. 1—Issue 1.

Potter, Richard et al., "Improving the Accuracy of Touch Screens: An Experimental Evaluation of Three Strategies," CHI '88, 1988, pp. 27-32, ACM, ACM #0-89791-265-9/88/0004/0027.

Rao, Ramana and Card, Stuart K. "Exploring Large Tables with the Table Lens," CHI '95 Mosaic of Creativity, May 7-11, 1995, pp. 403-404, ACM Denver, ACM #0-89791-755-3/95/005.

Rao, Ramana and Card, Stuart K. "The Table Lens: Merging Graphical and Symbolic Representations in an Interactive Focus+Content Visualization for Tabular Information," Reprinted from: Proceedings of the ACM SIGCHI Conference on Human Factors in Computing Systems, Apr. 1994, pp. 1-7, ACM Boston.

Ren, Xiangshi and Moriya, Shinji "Efficient Strategies for Selecting Small Targets on Pen-Based Systems: an Evaluation Experiment for

(56) References Cited

OTHER PUBLICATIONS

Selection Strategies and Strategy Classifications," IFIP Conference Proceedings, Proceedings of the IFIP TC2/TC13 WG2.7/WG13.4 Seventh Working Conference on Engineering for Human-Computer Interaction 1998, pp. 19-37, vol. 150, Japan.
Ren, Xiangshi and Moriya, Shinji "Improving Selection Perfomance on Pen-Based Systems: A Study of Pen-Based Interaction for Selection Tasks," ACM Transactions on Computer-Human Interaction, Sep. 2000, pp. 384-416, vol. 7—No. 3, ACM #1073-0516/00/0900-0384.
Ren, Xiangshi and Moriya, Shinji "The Best among Six Strategies for Selecting a Minute Target and the Determination of the Minute Maximum Size of the Targets on a Pen-Based Computer," IFIP Conference Proceedings, Proceedings of the IFIP TC13 Interantional Conference on Human-Computer Interaction, 1997, pp. 85-92, Chapman & Hall, ISBN 0-412-80950-8.
Riecken R. Douglas "Adaptive Direct Manipulation," 1991, pp. 1115-1120, IEEE Xplore, ISSN 0-7803-0233-8/91.
Robertson, George G. and Mackinlay, Jock D. "The Document Lens" UIST '93, Nov. 3-5, 1993, pp. 101-108, Atlanta, ACM #0-089791-628-X/93/0011.
Robertson, George G. et al., "The Next Generation GUI's: Information Visualizatioin Using 3D Interactive Animation," Communications of the ACM, Apr. 1993, pp. 57-71, vol. 36—No. 4, ACM #0002-0782/93/0400-056.
Rosner, P. et al., "In Touch: A Graphical User Interface Development Tool," Software Toold for Interface Design, IEE Colloquium, Nov. 8, 1990, pp. 12/1-12/7, IEEE Explorer, London.
Sarkar, Manojit and Brown, Marc H. "Graphical Fisheye Views of Graphs," Mar. 17, 1992, 31 pgs., Digital Equipment Corporation.
Sarkar, Manojit and Brown, Marc H. "Graphical Fisheye Views of Graphs," Proceedings of the ACM SIGHI '92 Conference on Human Factors in Computing Systems CHI '92, May 3-7, 1992, pp. 83-91, ACM #0-89791-513-5/92/0005/-0083.
Sarkar, Manojit and Brown, Marc H. "Graphical Fisheye Views," Communications of ACM, Dec. 1994, pp. 73-84, vol. 37—No. 12, ACM #0002-0782/94/1200.
Sarkar, Manojit et al., "Stretching the Rubber Sheet: A Metaphor for Viewing Large Layouts on Small Screens," UIST '93, Nov. 3-5, 1993, pp. 81-91, ACM #0-89791-628-X/93/0011.
Schaeffer, Doug et al., "Navigating Hierarchically Clustered Networks through Fisheye and Full-Zoom Methods," ACM Transactions on Computer-Human Interaction, Jun. 1996, pp. 162-168, vol. 3—No. 2.
Scott, Brenda and Conzola, Vincent "Designing Touch Screen Numeric Keypads: Effects of Finger Size, Key Size, and Key Spacing," Proceedings of the Human Factors and Ergonomics Society 41st Annual Meeting, 1997, pp. 360-364.
Sears, Andrew and Shneiderman, Ben "High Precision Touchscreens: Design Strategies and Comparisons with a Mouse," Int. J. Man-Machine Studies, 1991, pp. 593-613, Issue 34, Academic Press Limited, #0020-7373/91/040593.
Sears, Andrew et al., "Advances in Human-Computer Interaction" 1992, entire book, vol. 3, Ablex Publishing Corporation.
Sears, Andrew et al., "Investigating Touchscreen Typing: the Effect of Keyboard Size on Typing Seed," Behaviour & Information Technology, 1993, pp. 17-22, vol. 12—No. 1, Taylor & Francis Ltd., #0144-929X/93.
Shneiderman, Ben "Designing the User Interface—Strategies for Effective Human-Computer Interaction," 1992, entire book, 2nd Edition, Addison-Wesley Publishing Company (divided in six (6) parts for uploading purposes).
Shneiderman, Ben "Designing the User Interface—Strategies for Effective Human-Computer Interaction," 1998, entire book, 3rd Edition, Addison-Wesley Publishing Company (divided in seven (7) parts for uploading purposes).
Shneiderman, Ben "Direct Manipulation for Comprehensible, Predictable and Controllable User Interfaces," International Conference on Intelligent User Interfaces, Proceedings of the 2nd International Conference on Intelligent User Interfaces, 1997, pp. 33-39, Orlando, ISBN #0-89791-839-8.
Shneiderman, Ben "Sparks of Innovation in Human-Computer Interaction," 1993, Table of Contents, Title Page, Ch.4, Ch 6, and List of References, B. Shneiderman, Ed., Ablex Publ., Norwood, NJ.
Shneiderman, Ben "The Eyes Have it: A Task by Data Type Taxonomy for Information Visualizations," Proceedings of the 1996 IEEE Symposium on Visual Languages (VL '96), 1996, pp. 336-343, IEEE #0-8186-7469-5/96.
Shneiderman, Ben "Touch Screens Now Offer Compelling Uses—Tools, Techniques, and Concepts to Optimize User Interfaces," Mar. 1991, pp. 93-94, IEEE Software, IEEE Xplore.
Simkovits, Daniel "LP-DOS Magnifies the PC Screen," 1992, p. 203-204, IEEE #0-8186-2730-1/92.
Simon, "Simon Says—Here's How," User's Manual, Jul. 1994, entire manual, © IBM Corporation.
Smith, Ray and Anderson, Paul "Relating Distortion to Performance in Distortion Oriented Displays," 1996, pp. 6-11, IEEE #0-8186-7525-X/96.
Stone, Maureen C., et al., "The Movable Filter as a User Interface Tool," CHI '94, Human Factors in Computer Systems, 1994, pp. 306-312, Boston, ACM #0-89791-650-6/94/0306.
Su, Joseph C. "A Review of Telesensory's Vista PCI Screen Magnification System," JVIB—Journal of Visual Impairment and Blindness, Oct. 1998, pp. 705 and 707-710, vol. 92—No. 10.
Su, Joseph C. and Uslan, M.M., "A Review of ZoomText Xtra Screen Magnification Program for Windows 95," JVIB—Journal of Visual Impairment and Blindness, Feb. 1998, pp. 116-119.
Su, Joseph C., et al., "A Review of Supernova Screen Magnification Program for Windows," JVIB News & Features, Product Evaluation, Journal of Visual Impairment & Blindness, Feb. 1999, pp. 108-110.
The HP 150 "Hardware: Compact, Powerful, and Innovative" Oct. 1983, pp. 36-50, vol. 8—Issue 10, BYTE Publications.
Uslan, M.M. and Su, Joseph C., "A Review of Two Screen Magnification Programs for Windows 95: Magnum 95 and LP-Windows," JVIB—Journal of Visual Impairment and Blindness, Sep.-Oct. 1997, pp. 9-13.
Uslan, Mark M. et al., "A Review of Henter-Joyce's MAGic for Windows NT," JVIB—Journal of Visual Impairment and Blindness, Dec. 1999, pp. 666-668.
Vogel, Daniel and Baudish, Patrick "Shift: A Technique for Operating Pen-Based Interfaces Using Touch," CHI 2007 Proceedings, Mobile Interaction Techniques I, Apr. 28-May 3, 2007, pp. 657-666, San Jose, ACM #978-1-59593-593-9/07/004.
Ware, Colin and Lewis, Marlon "The DragMag Image Magnifier," CHI Companion '95 Mosaic of Creativity, May 7-11, 1995, pp. 407-408, Denver, ACM #0-89791-755-3/95/0005.

* cited by examiner

SPOKEN INTERFACES

This application is a continuation of co-pending U.S. patent application Ser. No. 10/956,720, filed on Oct. 1, 2004.

BACKGROUND

1. Field

Embodiments of the invention relate to computer software, and more particularly, to computer software for assisting visually impaired users to access and interact with computer systems.

2. Background

Most modern operating systems provide a rich graphical user interface (GUI) as the primary means of interacting between a user and the applications and resources of the system. GUIs, while useful to most people, impose a significant challenge to those with disabilities such as blindness, visual impairment, and gross or fine motor challenges.

An individual with a physical or visual impairment or similar disability may install and utilize accessibility software on their personal computer. Accessibility software may provide a set of tools to assist a physically or visually impaired user. The set of tools includes a screen reader that reads the text being displayed on the screen using text-to-speech (TTS) technology, and a navigation tool to allow a user to navigate the operating system GUI using only the keyboard, or in some cases by adapting a pointing device (e.g., mouse) input. In addition to these capabilities, accessibility software for impaired users works with external hardware devices to allow output to be streamed to a refreshable Braille display.

Existing accessibility software may conflict with other applications or be unable to properly describe these applications unless the applications are specifically designed to be used with a particular accessibility application. As a result, accessibility applications may become non-functional and unable to recover due to programming and run time conflicts with other applications. The non-functional state of the accessibility application hinders the ability of the impaired user to continue to operate an application or navigate the operating system. The impaired user may not have any means of determining the state of the computer system when the accessibility application becomes non-functional. Also, the accessibility application does not run during system start up and a user attempting to utilize the system during start up is not able to access the utilities of the accessibility application.

Existing accessibility applications attempt to provide full keyboard navigation (FKN). This means that while an operating system GUI might be designed primarily for mouse manipulation, it can also be driven from the keyboard by using keyboard commands to move around a screen or to select functions of applications that are currently in the focus or displayed by the operating system. However, existing accessibility applications are not able to allow a user to access all options or features of a GUI. Also, the navigation systems on accessibility applications for impaired individuals may have key mappings that conflict with the key mappings of other applications. This causes either a loss of functionality in the accessibility application stranding the user relying on the navigation system and utilities provided by the accessibility application.

SUMMARY

In one embodiment, enhanced accessibility through an operating system level service is provided for assisting a visually impaired user to obtain audible information and interact with elements of a standard user interface provided by the operating system. The service enables access and control of elements of the standard interface including control of any application that implements the accessibility advanced programmer interface and is being executed by the operating system and any element that may be hidden by other windows. The program may receive user input data from an input device and adjust an accessibility cursor to facilitate navigation and selection of an element of an application. The element selected by the cursor may be either an editing type element or non-editing type element. The program may provide audio information regarding the selected editing or non-editing element and may enable interaction with the selected element. Manipulation of the accessibility cursor may be accomplished independent of keyboard cursor and mouse pointer control. The enhanced accessibility services may operate during times that the operating system provides a graphical user interface and may restart automatically if it encounters a fatal error.

BRIEF DESCRIPTION OF THE DRAWINGS

The invention is illustrated by way of example and not by way of limitation in the figures of the accompanying drawings in which like references indicate similar elements. It should be noted that different references to "an" or "one" embodiment of this disclosure are not necessarily to the same embodiment, and such references mean at least one.

DETAILED DESCRIPTION

In the following description, specific details are set forth. However, it is understood that embodiments of the invention may be practiced without these specific details. In other instances, well-known circuits, structures and techniques have not been shown in detail to avoid obscuring the understanding of this description.

Figure 1:
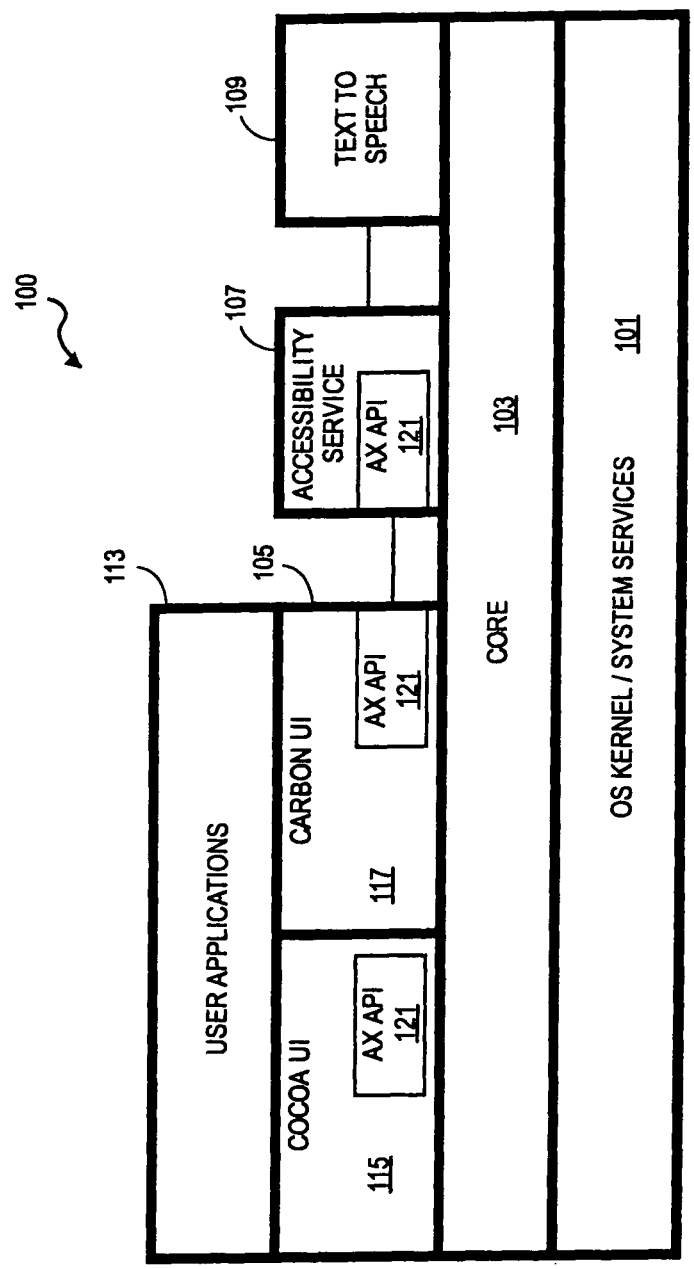
FIG. 1 is a diagram of one embodiment of the software architecture of a computer system including an accessibility service.

FIG. 1 is a diagram of one embodiment of the software architecture for a computer system. In one embodiment, the software architecture 100 may be executed by a general computer system such as a home desktop system, office workstation or similar computer system. In one embodiment, the software architecture 100 may include multiple architectural 'layers' including a core operating system and system services layer or 'kernel' layer 101, a core layer 103, user interface layer 105, user application layer 113 or similar architectural layers or components. In one embodiment, an accessibility service 107 and text-to-speech program 109 may be at the same layer or level as the user interface layer 105.

In one embodiment, the kernel layer 101 may be responsible for general management of system resources and processing time. The kernel 101 may schedule programs for execution, manage memory, service interrupts and perform similar core system tasks. In one embodiment, the core layer 103 may provide a set of interfaces, programs and services for use by the kernel 101, user interface layer 105 including accessibility service 107 and text-to-speech program 109 and user applications 113.

In one embodiment, the user interface layer 105 may include advanced programmer interfaces (APIs), services and programs to support user applications 113 and the operating system user interface. In one embodiment, the operating system may be the OS X operating system by Apple Computer, Inc. The user interface layer 105 may include the Cocoa user interface (UI) and Carbon UI 117. The Cocoa UI 115 provides a set of object oriented classes, APIs and similar resources to support the development of user applications and the user application environment. The Carbon UI 117 provides a set of procedural programs, utilities and APIs to support the development of user applications and the user application environment. Each user interface layer 105 component may include an accessibility API (AX API) 121 providing a set of classes, programs or utilities that facilitate the use of applications and the operating system by individuals with visual and physical impairments. Each AX API 121 may provide a set of classes, programs or utilities appropriate to the user interface layer in which it is placed. As used herein, the accessibility services are 'integrated' with the operating system by implementation of the AX API 121 at the user interface layer or similar layer of the operating system.

In one embodiment, the accessibility service 107 may provide a set of utilities, tools and classes that support a set of integrated accessibility features. The accessibility service 107 may provide support for an accessibility cursor navigation tool, audible interface and similar features for use by individuals with visual and physical impairments. In one embodiment, a separate text-to-speech module or program may also be present to convert text descriptions of programs, text in fields of programs and similar text into audible speech at the direction of the accessibility service 107. The audible interface and text-to-speech features may generate part of the accessibility presentation for a user. An accessibility presentation as used herein includes all non-standard user interface tools that assist an impaired user including audible output magnification, Braille output and similar output types.

There may be a number of advantages associated with integrating at least a portion of the accessibility service 107 into the operating system. First, the accessibility service may be restarted automatically if it crashes. The accessibility service 107 may be running during all user scenarios such as during installation, login sessions, even during the introduction screens that appear the first time a user boots a brand new computer. Tight integration with the operating system provides a safe mechanism for defining new keyboard shortcuts that are rooted off the same modifier keys. This decreases instability in running applications, and results in more intuitive and memorable key choices. Tight integration of the accessibility service 107 with the operating system also permits true full keyboard navigation (FKN) because the accessibility service 107 may have priority for all key mappings over user applications. This further provides a user with greater consistency in keyboard usage as the same key mappings may be consistently used across all applications.

In one embodiment, the user application layer 113 may be an environment and set of user applications that are directly utilized by a user. Input into the computer system may be provided by a user that is intended to control and interact with the user applications. User applications may be installed on the computer system by a user. User applications may include word processing applications, spreadsheet applications, video games, email programs, Internet browsers and similar applications. In one embodiment, the user applications that adopt the AX API are completely accessible by the accessibility service 107. User applications that do not adopt the AX API may provide reduced or minimal compatibility with the accessibility service 107.

Figure 2A:
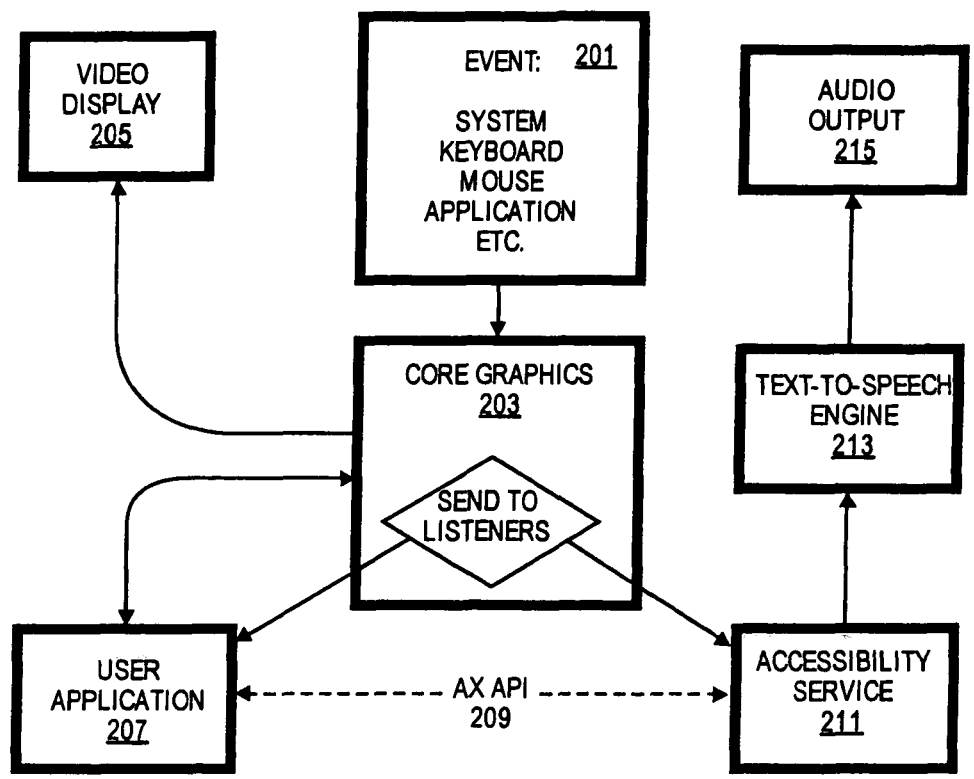
FIG. 2A is a flowchart of one embodiment of the operation of the computer system including an accessibility service.

FIG. 2A is a flowchart of one embodiment of the function of the enhanced accessibility service in the computer system. In one embodiment, the function of the accessibility service in the computer system is initiated by a system event (block 201). A system event may be an input received from a user through an input device such as a keyboard, mouse, or similar input device. A system event may also be generated by the operating system or computer system, such as a timer, interrupt or similar system event. A user application or similar user program may also generate an event to initiate the enhanced accessibility service.

In one embodiment, the system event may be passed to core graphics system. The core graphics system may be responsible for managing the graphical user interface (GUI). The core graphics system may generate a signal to display the user interface on a video display at the direction of a user application or an accessibility service. The core graphics system or similar aspect of the operating system may determine the programs that are related to the system event and forward the system event to each of these programs or operating system components or similar system components.

In one embodiment, the system event may be forwarded by the core graphics system to both a user application and to an accessibility service (block 203). The user application may respond to the input including the generation of requests to the core graphics system to update the video display (block 207). For example, a user typing to a word processing application may generate a keyboard event for each key depressed. The keyboard event may be passed to the word processor, which is a user application. The user application then requests (block 207) that the core graphics system update the video display (block 203) to reflect the changes input by the user. In this example, the word processor may request that the input letters be displayed on the video display.

In one embodiment, the accessibility service receives the system event at approximately the same time as a user application or similar programs. The accessibility service analyzes the system event to determine any changes to the user interface and user application that may occur as a result of the system event (block 211). For example, if a mouse movement event is received the accessibility service may check to determine which user interface items are now being pointed to by a mouse cursor or accessibility cursor. The accessibility service may query the user application or similar program or component that received the same system event using the AX API (block 209) to determine what changes may have been made by the system event or to retrieve data related to the system event or a change in status for the user interface. For example, an accessibility cursor may be pointed at a word processor. As new characters are typed they are displayed through the interface. These additional letters may be gathered by the accessibility service as well as displayed by the user application for further processing to enhance accessibility (e.g., text-to-speech feedback). If a user provides input relating to navigation or program operation, the application would respond and the accessibility service would monitor to determine if an enhanced accessibility should be applied.

In one embodiment, if the accessibility service determines that the user interface data has changed or an element has been selected then related text or similar data may be passed to a text-to-speech engine. The text-to-speech engine may convert text or similar input data into an audio signal that may be output to an audio output port (block 213). The audio output may be connected with a speaker system or similar device to produce the audible feedback (block 215). For example, the typed letters received by a word processor may each be announced as they are typed. The audio output may include an audio driver or program for managing an audio card or chipset to generate an audio signal to be output to a speaker system or similar audio system. In another embodiment, the accessibility program may provide other utilities to a user based on gathered input data and status. Additional utilities include augmenting audible text-to-speech feedback with contextual information, navigation information and similar information. For example, a user input that changes the current active window may generate audible feedback describing the new window selected. In one embodiment, the additional utilities provided may include additional navigation options such as slider adjustment assistance that allows a user to input a value to set a scroll bar position in a slider for a window or similar interface, an augmented audible or visual navigation menu providing special navigation options and similar augmented services.

In one embodiment, the accessibility service may specify separate voices to be utilized by the text-to-speech program. Separate voices may be utilized for different output types (e.g., actual text may have one voice and contextual information may have another voice), different output sources (e.g., different applications may have different voices assigned to them) or similar scenarios. The text-to-speech program may support any number of voices such as a range of male and female voices, cartoon style voices and similar voices for providing audible feedback to a user. In one embodiment, the accessibility services may provide an indicator with output sent to the text-to-speech program to specify which voice is to be used with an output.

In one embodiment, the accessibility services may allow a user to specify the amount of audible, Braille or other output information provided by the accessibility presentation to a user. The accessibility service may provide an interface to set a 'chattiness' level. A low chattiness level may restrict the feedback information to minimal context information, to only return specifically selected data or similar minimal feedback. A high chattiness level may prompt the accessibility service to provide a verbose description of the context of an accessibility cursor or similar information.

Figure 2B:
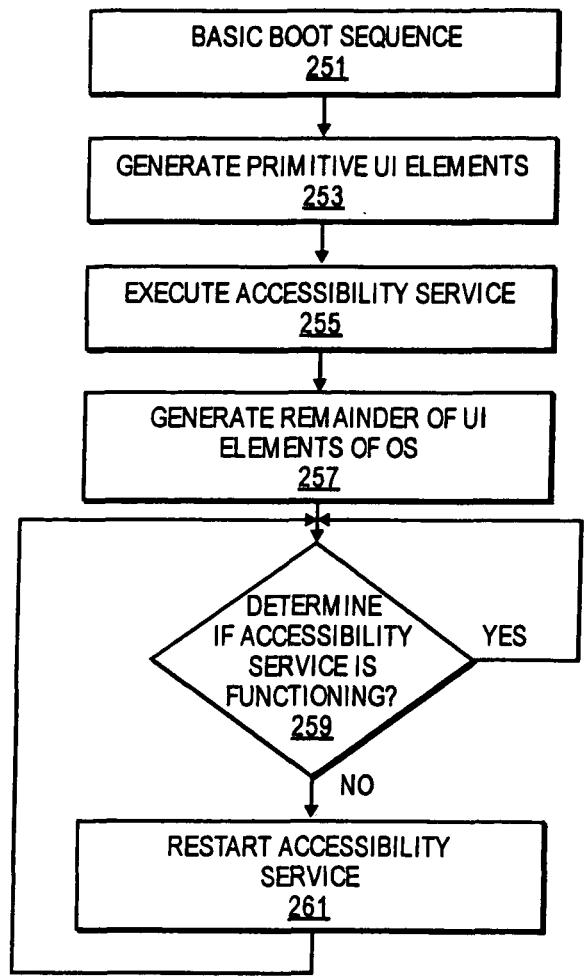
FIG. 2B is a flowchart of one embodiment of a process for automatically restarting the accessibility service.

FIG. 2B is a flowchart of one embodiment of a process for automatically restarting accessibility services if a fatal error occurs. In one embodiment, the operating system starts up using a standard boot sequence (block 251). During the boot sequence, the user interface layer generates the basic or primitive user interface elements (block 233).

In one embodiment, the AX API is utilized to start accessibility services for each user interface element (block 255). Initializing accessibility services may include generating separate threads for accessibility service components. For example separate threads may be assigned to each application manager, window manager or element manager of the accessibility service. These components are described further below. The boot sequence may continue to complete the generation of all user interface elements (block 257).

In one embodiment, the operating system may complete the boot up sequence and continue normal operation. During normal operation, the operating system may monitor the status of the components of the accessibility service (block 259). Additional application and accessibility services components may be initiated or closed during normal operation. The operating system may monitor for events that indicate the failure of an application or accessibility service component. The operating system may poll or similarly check accessibility components to determine if they are functioning normally. The check may be at the kernel level such as a kernel level daemon.

In one embodiment, detection of a fatal error for an accessibility service component or the time out of a check on a component may cause the operating system to kill the thread or process that timed out or caused the fatal error. The operating system may then restart the accessibility components (block 261). This ensures that the accessibility service will operate at all times during system start up and after start up.

In one embodiment, if all accessibility components are responsive and no fatal errors reported, the operating system continues normal operation. The operating system may continue to periodically check the accessibility service to ensure its proper function.

Figure 3A:
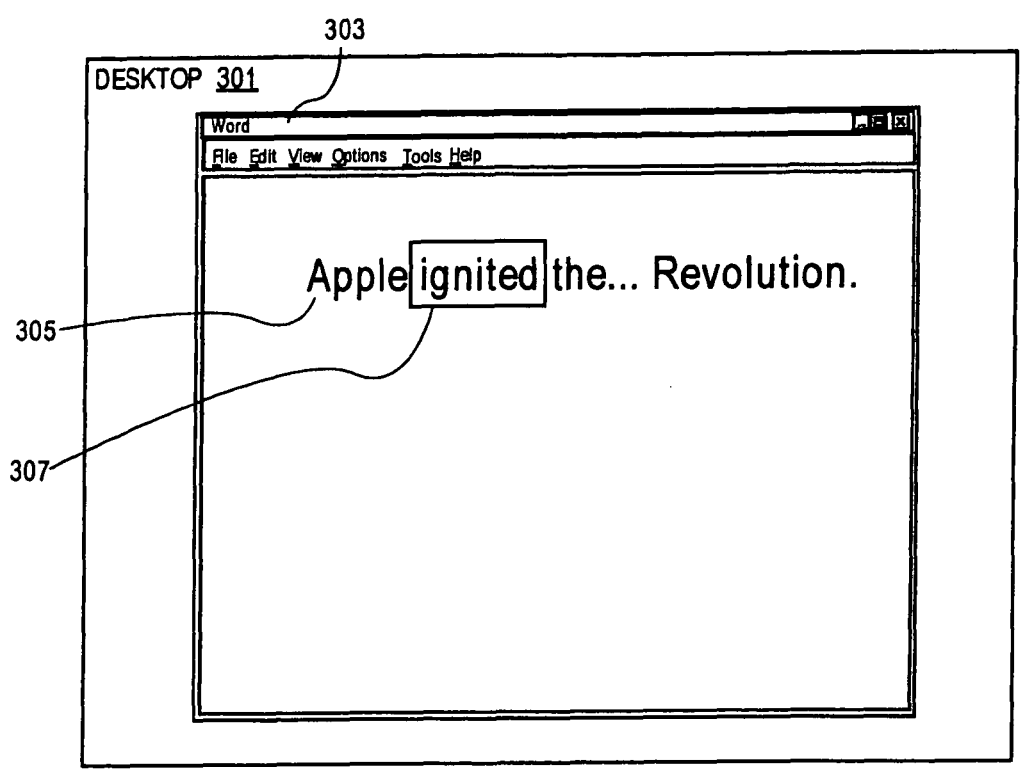
FIG. 3A is a diagram of one embodiment of an accessibility cursor.

FIGS. 3A through 3H are diagrams of embodiments of the utilities provided by the accessibility service including an accessibility cursor. FIG. 3A is a diagram of one embodiment of an accessibility cursor being used in a word processor application. In one embodiment, the accessibility cursor 307 may be used in the basic windows and desktop 301 environment. The accessibility cursor 307 may be used to cause text 305 in an application 303 to be made accessible to a user with limited vision or similar disability. The highlighted text may be output audibly by a text-to-speech program, output by a refreshable Braille display or similarly provided to a user as part of an accessibility presentation. In one embodiment, orientation and context cues may also be provided as output based on the position of the accessibility cursor 307. In one embodiment, the accessibility cursor 307 may be visible as a box or highlighting around text being 'viewed' by the user or by a similar indicator. The accessibility cursor 307 may be controlled by a keyboard or similar input device. The movement may be controlled by conventional arrow keys, hot keys or similar input. The navigation of the accessibility cursor 307 may enable access and control of various elements of application programs, including editable elements and non-editable elements.

In this regard, the use of the accessibility cursor 307 may enable a visually impaired computer user to obtain audio information regarding non-editable visual cues on the screen such as static text, prompts, icons, etc. Further, in addition to reading the text of a selected editable element, the accessibility service may also be capable of describing visual context surrounding the text and elements on the display screen.

Figure 3B:
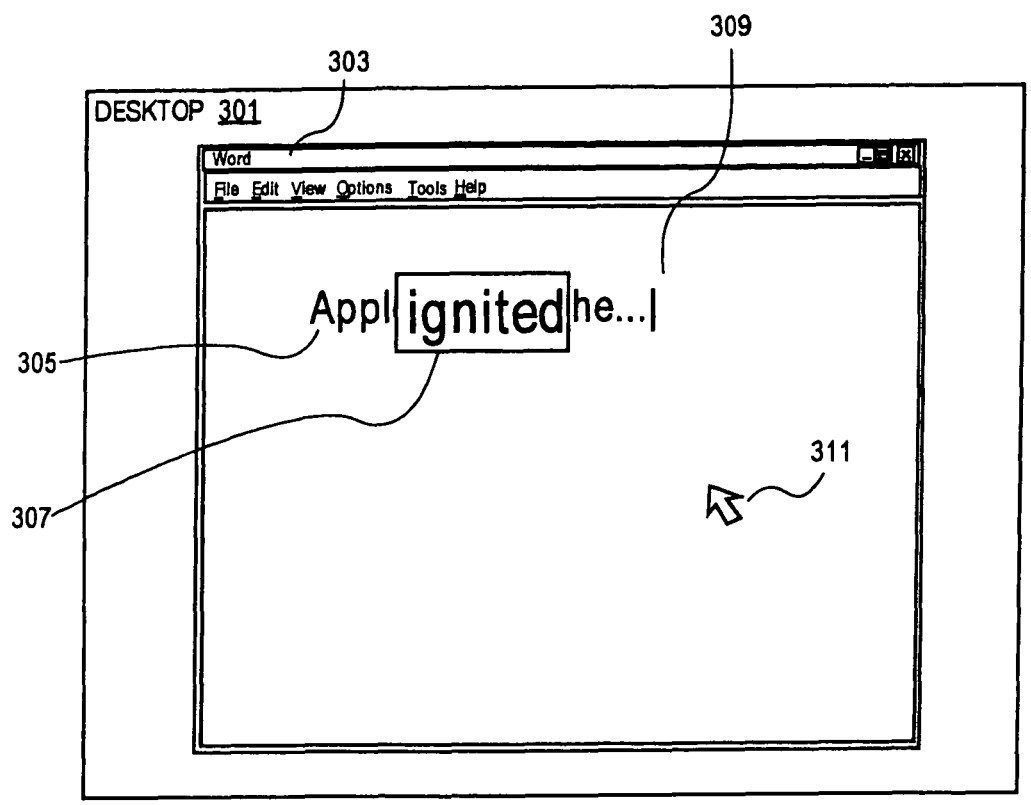
FIG. 3B is a diagram of one embodiment of text magnification provided by an accessibility cursor.

FIG. 3B is a diagram of one embodiment of the accessibility cursor of FIG. 3A where the cursor has zoomed on the selected text. Many low-vision screen reader users utilize a combination of limited vision in conjunction with accessibility software. To facilitate usefulness for low-vision users, the accessibility cursor may have the ability to magnify its currently focused element with a zoom function. This technique is different from full screen magnification offered on many conventional systems, as it only magnifies the element of interest. For some visually impaired uses, this may make it easier to follow the accessibility cursor on the screen, and positively identify which element is in focus.

In one embodiment, placing the accessibility cursor 307 over text 305 may cause the text to be enlarged to facilitate viewing by users with limited vision. The zoom may be automatic or controlled by a user. For example, magnification may be initiated by keyboard input. The user may provide input through the keyboard or similar input device to control the zoom and focus of the accessibility cursor. In one embodiment, the user may specify the size of the accessibility cursor or the amount of text or similar display elements to be magnified during a zoom. In one embodiment, a user may zoom in to a maximum zoom that renders the element being viewed translucent allowing a user to view the information behind that element.

In one embodiment, the accessibility cursor may be operated independently of the keyboard cursor 309, mouse pointer 311 or similar cursor or pointer system. A user may control the accessibility cursor separately by use of a separate input device, separate subset of keys, separate operations mode or similar system.

Figure 3C:
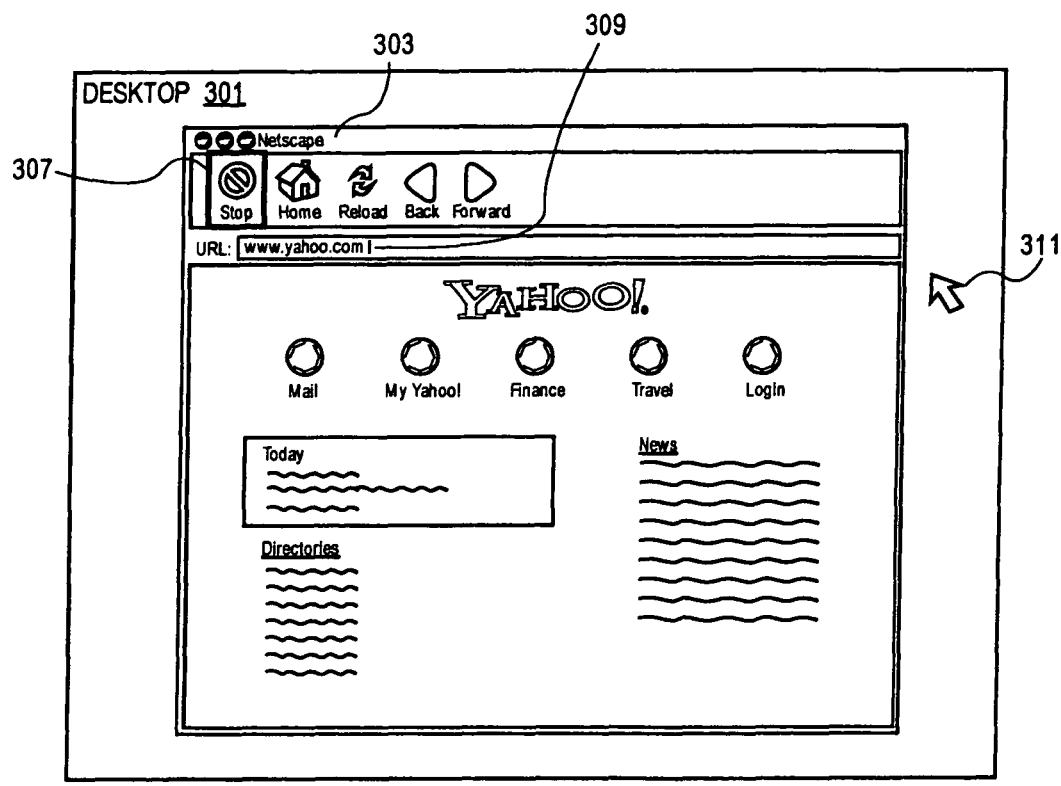
FIG. 3C is a diagram of one embodiment of an accessibility cursor indicating a navigation element.

FIG. 3C is a diagram of one embodiment an accessibility cursor in a browser application. The accessibility cursor 307 may move independently of the keyboard cursor 309 or mouse pointer 311. The user may move the accessibility cursor 307 to an element in a running application, interrogate elements, and in some cases even manipulate certain elements without affecting the keyboard cursor 309 or mouse pointer 311. The accessibility cursor may provide the ability to glance, inspect, and control elements in a running application while allowing the keyboard cursor to be used for primary input.

Figure 3D:
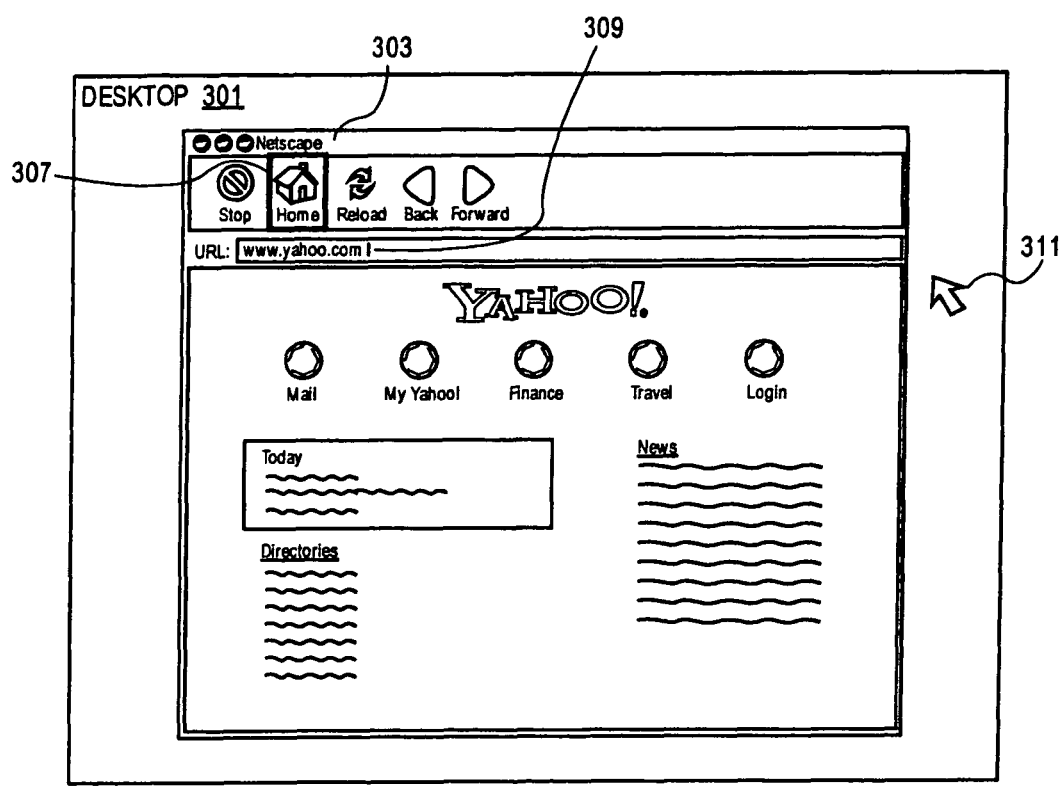
FIG. 3D is a diagram of one embodiment of an accessibility cursor selecting a navigation option.

The accessibility cursor 307 may be used to select an element such as a button, menu option or similar navigation option. In one embodiment, the accessibility cursor 307 may highlight, box or similarly indicate the selected element. For example, accessibility cursor 307 highlights a 'stop' option in FIG. 3C. FIG. 3D illustrates the movement of accessibility cursor 307 to highlight a 'home' option without affecting the keyboard cursor 304 or mouse pointer 311.

Figure 3E:
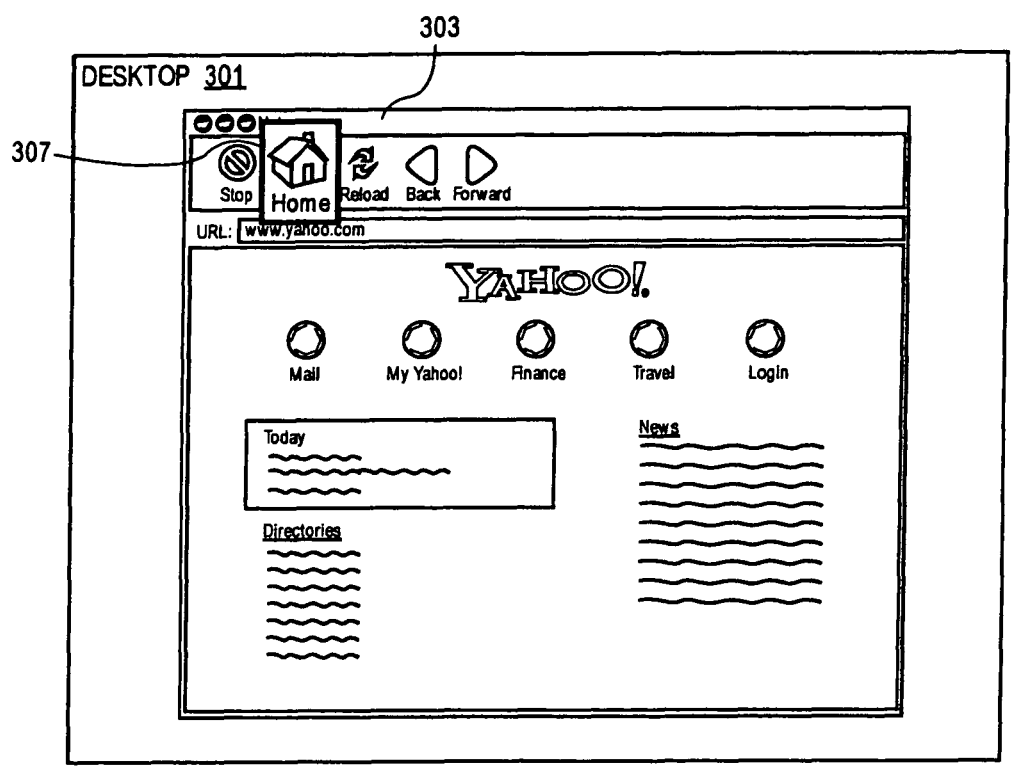
FIG. 3E is a diagram of one embodiment of an accessibility cursor selecting a navigation option.

FIG. 3E is a diagram of one embodiment of the accessibility cursor of FIG. 3E. The cursor has zoomed on the selected element. In one embodiment, placing the accessibility cursor 307 over the element may cause the element to be enlarged to facilitate viewing by a user with limited vision. The zoom may be automatic or controlled by a user. The user may provide input through the keyboard or similar input device to control the zoom and focus of the accessibility cursor. In one embodiment, the use may specify the size of the accessibility cursor or the number of elements to be magnified.

Figure 3F:
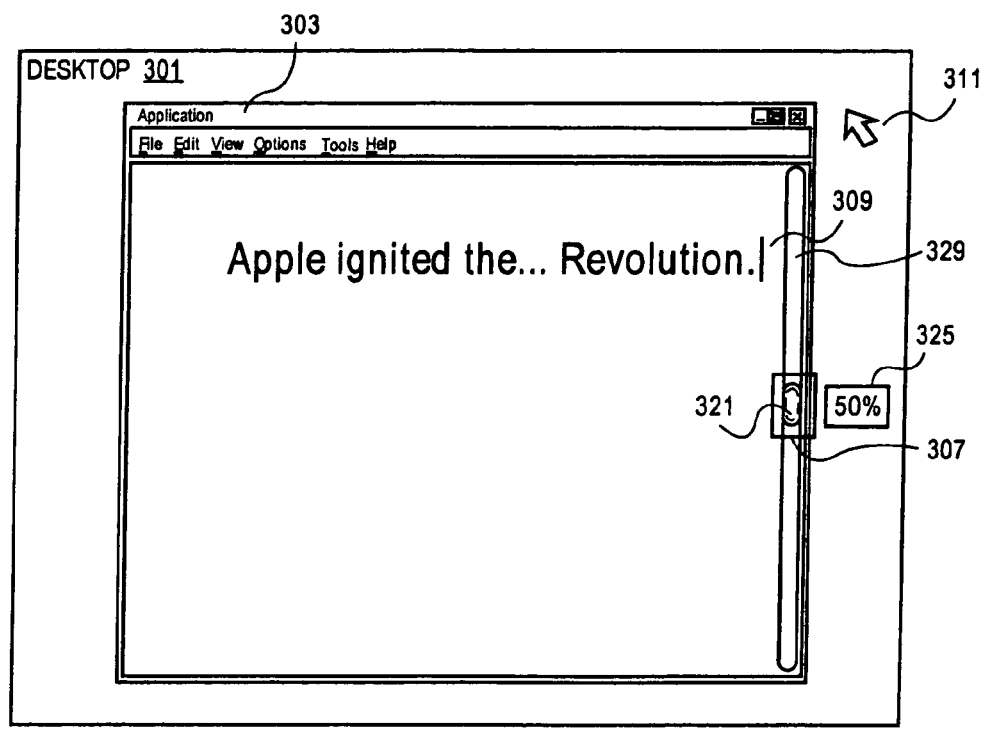
FIG. 3F is a diagram of one embodiment of an accessibility service providing a slide position selector tool.

FIG. 3F is a diagram of one embodiment of the accessibility service providing a slider adjustment tool. Speech is a low-bandwidth communication vehicle, thus, conveying a sufficient amount of contextual information might produce paragraphs of spoken text. The accessibility service may break up this text into useful chunks, which can be queried and navigated by pressing keyboard keys. By adding the accessibility cursor 307 as a distinct and separate cursor from the keyboard cursor, restrictions on how a particular accessibility control can be designed are removed. The design need not be compromised by the existing keyboard cursor's capabilities, which may be useful for a sighted user, but which may actually hinder a blind user. For example, full keyboard navigation (FKN) provides the ability to increase and decrease the value of a slider control by using the arrow keys. While this might accomplish the task, it can be unwieldy or time consuming for a blind user.

In one embodiment, a slider adjustment tool may be utilized for application 303 running in the windowing or desktop environment 301. The accessibility cursor 307 may be utilized to select a slider 321. The accessibility service may provide an input mechanism 325 to allow a user to input a numeric value to indicate the desired position of the scroll bar. The accessibility cursor 307 may also provide feedback regarding the current position or context of the scroll bar in the slide 329. With the combination of the accessibility cursor and a custom accessibility slider control, a more efficient method of input can be designed which offers a better experience for the blind user, without impacting the original keyboard cursor's behavior.

Figure 3G:
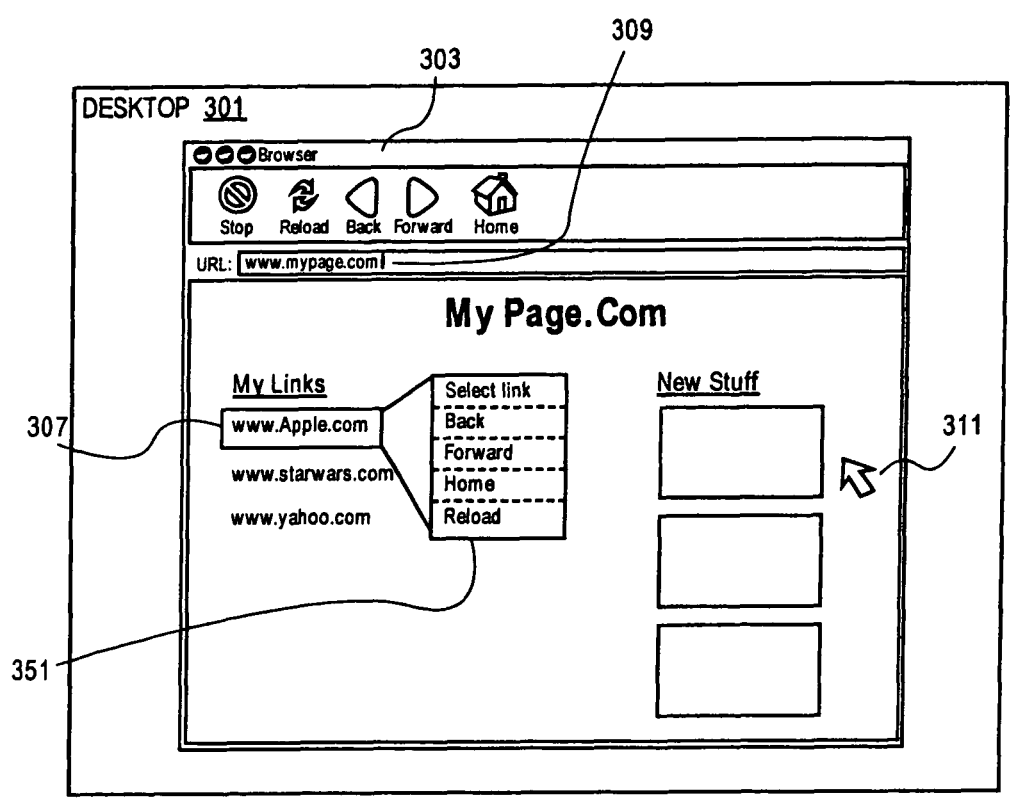
FIG. 3G is a diagram of one embodiment of an accessibility service providing a smart menu.

FIG. 3G is a diagram of one embodiment of a smart menu tool provided by the accessibility service. One problem associated with conventional accessibility applications is that it is difficult for a user to learn numerous keyboard definitions and remember which options are available at any given time. This problem is mitigated by one embodiment of the accessibility service that provides a "smart" menu that displays all commands that are appropriate for the current situation. In one embodiment, the accessibility service may operate in a desktop or window environment 301 and in conjunction with an application such as a browser 303. The accessibility cursor 307 may provide a menu 351 of current navigation or similar options that are currently available. For example, if the cursor highlights a link in a webpage through a browser 303 then the smart menu may present current options, audibly or through similar method, such as 'back', 'forward,' 'select', 'home', and similar options. In other examples, the user can focus on a button and have one possible command, such as, "press", or the user could land on an element (e.g., slider) that has several possible commands, such as, "increase," "decrease," "jump to minimum" and "jump to maximum." In each case, the smart menu contains only what is appropriate at the given time.

Figure 3H:
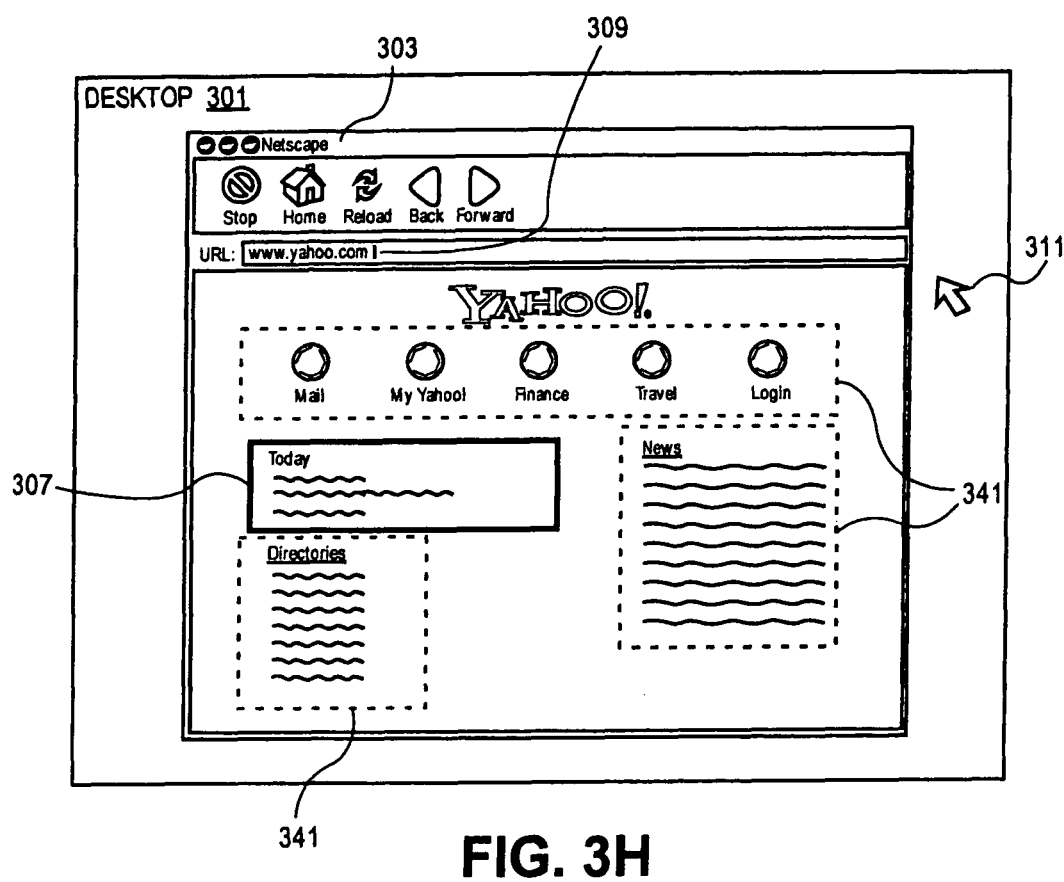
FIG. 3H is a diagram of one embodiment of an accessibility service providing a blocking navigation feature.

FIG. 3H is a diagram of one embodiment of a blocking interface. In one embodiment, additional features that may be provided by the accessibility services include block navigation. The accessibility service may group large sets of navigation options or similar information into navigation blocks 341 to facilitate the ease of navigation through the information. This may be particularly useful in scenarios where a large number of navigation options or information may be available. For example, a web page accessed by a browser may provide a large number of links. A user with vision may easily identify the link that is desired. The accessibility service assists a user by grouping or blocking the navigation options or presented information. The user may gain some general description of a block and navigate the block in a tree like fashion or 'drill-down' to a particular navigation option by descending into subgroups or subblocks of a selected block using an accessibility cursor 307 without having to select a navigation option.

In one embodiment, the accessibility service may provide contextual summarizing information to assist in the navigation of various structures. For example, a user examining a table may obtain information regarding the number of columns and rows in the table. In addition to summarizing, the user may set the accessibility service to text or context character by character, spell phonetically (e.g., "B as in boy"), provide and indicate the presence of help functions or documents, provide orientation information (e.g., character position, word position, line position, and reading range settings), provide a list of running applications or windows, provide a feedback submission tool, key command descriptions, provide and indicate the presence of tool tips and similar utilities.

Figure 3I:
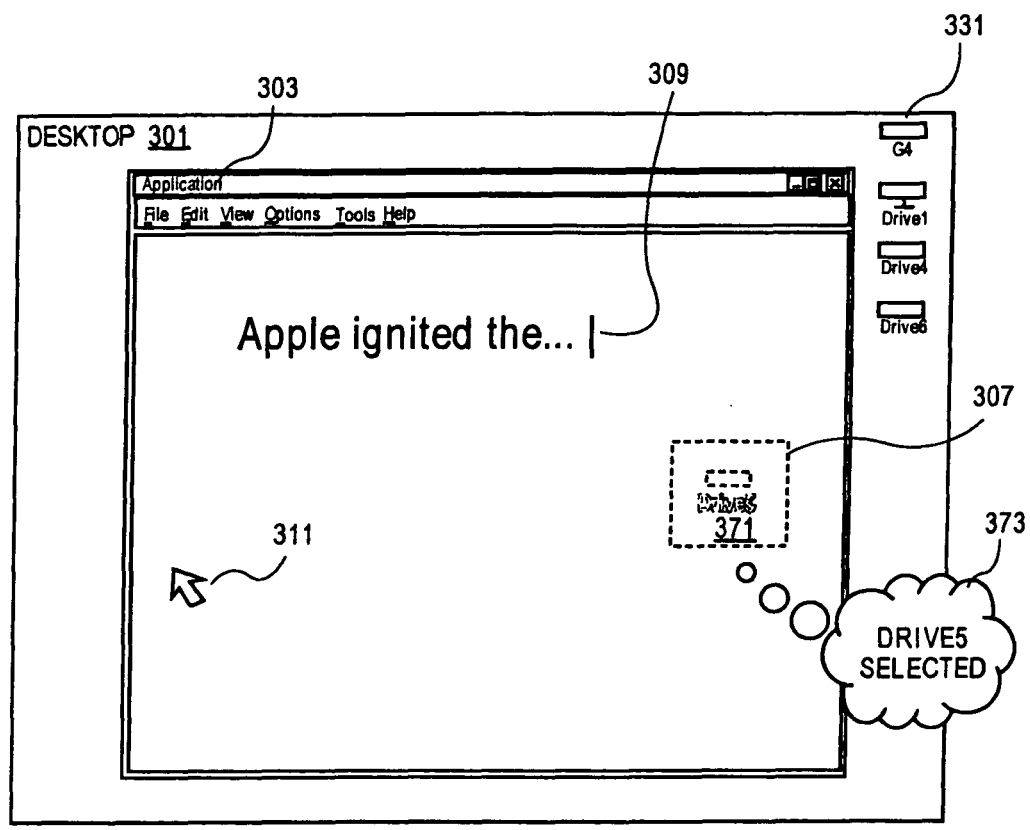
FIG. 3I is a diagram of one embodiment of an accessibility service providing access to an obscured user interface element.

FIG. 3I is a diagram of one embodiment of an accessibility cursor accessing an obscured user interface element. The accessibility services may provide the ability to move the accessibility cursor 307 to background applications, and it may even access elements which are obscured by overlapping windows. Accordingly, the accessibility cursor 307 feature may provide overcompensation for lack of vision, providing even more capabilities than a sighted user would otherwise have. Since the accessibility cursor 307 can move into background applications, even to elements 371 that are visually obscured by overlapping windows, the accessibility cursor 307, according to one embodiment, has the ability to temporarily reveal the visual appearance of elements that are hidden behind other windows. This may be accomplished by a user simply holding down a keyboard combination to bring that element forward. When the key is released, the element may drop back to its original level. Combined with the element magnification, this can provide useful aid to a partially sighted user. In one embodiment, obscured elements may be described audibly 373 using the text-to-speech module or the obscured feature may be similarly presented to a user.

In one embodiment, the accessibility service may include an event capture mode or 'greedy' mode. The greedy mode routes all input to the accessibility service. This mode may be used by the accessibility service at times when the user wants to issue a key or mouse event that should only be interpreted by the accessibility service or similarly restrict usage. For example, the user may utilize greedy mode to work around a non responsive application.

In one embodiment, the accessibility service may include a practice mode. The practice mode may utilize the greedy mode to route all input to the accessibility service. This mode may be used to allow a user to practice the use of the accessibility service. This mode may provide audible feedback so that a user may learn keys, key combinations and similar input.

In one embodiment, another feature offered by the accessibility service may be navigation option search. The search may look for navigation options that are available in a given context by pairing down the number of options based on progressive input from a user. For example, a user may be typing a uniform resource locator (URL) in a web browser, a name of a file or the name of a similar resource. The accessibility service begins to search for possible matching resources as each letter of the name is input. This provides the user with a faster navigation tool than having to 'tab' or similarly scan through possible navigation options.

In one embodiment, a web browser or similar application may utilize the enhanced accessibilities services. An accessibility cursor may be utilized to 'glance' at navigation options independent of the mouse pointer or keyboard cursor without having to select a navigation option. For example, a user may leave a keyboard cursor in a URL input field while glancing at links on a webpage. The accessibility cursor may be utilized to select text or links in a webpage to be magnified to assist a visually impaired user to more clearly inspect text or links without having to alter the default text sizing for a webpage that might distort the layout of the page.

In one embodiment, the accessibility service may be used to facilitate the viewing of lengthy webpages or frames of a website. The accessibility service provides enhanced scrolling services where a numerical value designating a scroll bar position may be specified. The accessibility services may describe the number of frames, overall size of a page or provide similar context information to facilitate web browsing. As described above, the accessibility services may provide smart menus to facilitate the selection of navigation options. Smart menus in a browser may make common browsing options such as returning to a previous page or refreshing a page easily accessible.

In one embodiment, blocking may be utilized in a web browser to facilitate navigation. A webpage may be sectioned or 'blocked' based on page based criteria or user based criteria. For example, navigation links may be blocked into internal site links and external links. Similarly web content may be blocked based on the category content or position on a page. 'Glancing' at a block provides an overview of the data of a block. Blocks may be layered or nested within a single page providing additional descriptive information, subcategorization or similar assistance.

Figure 4:
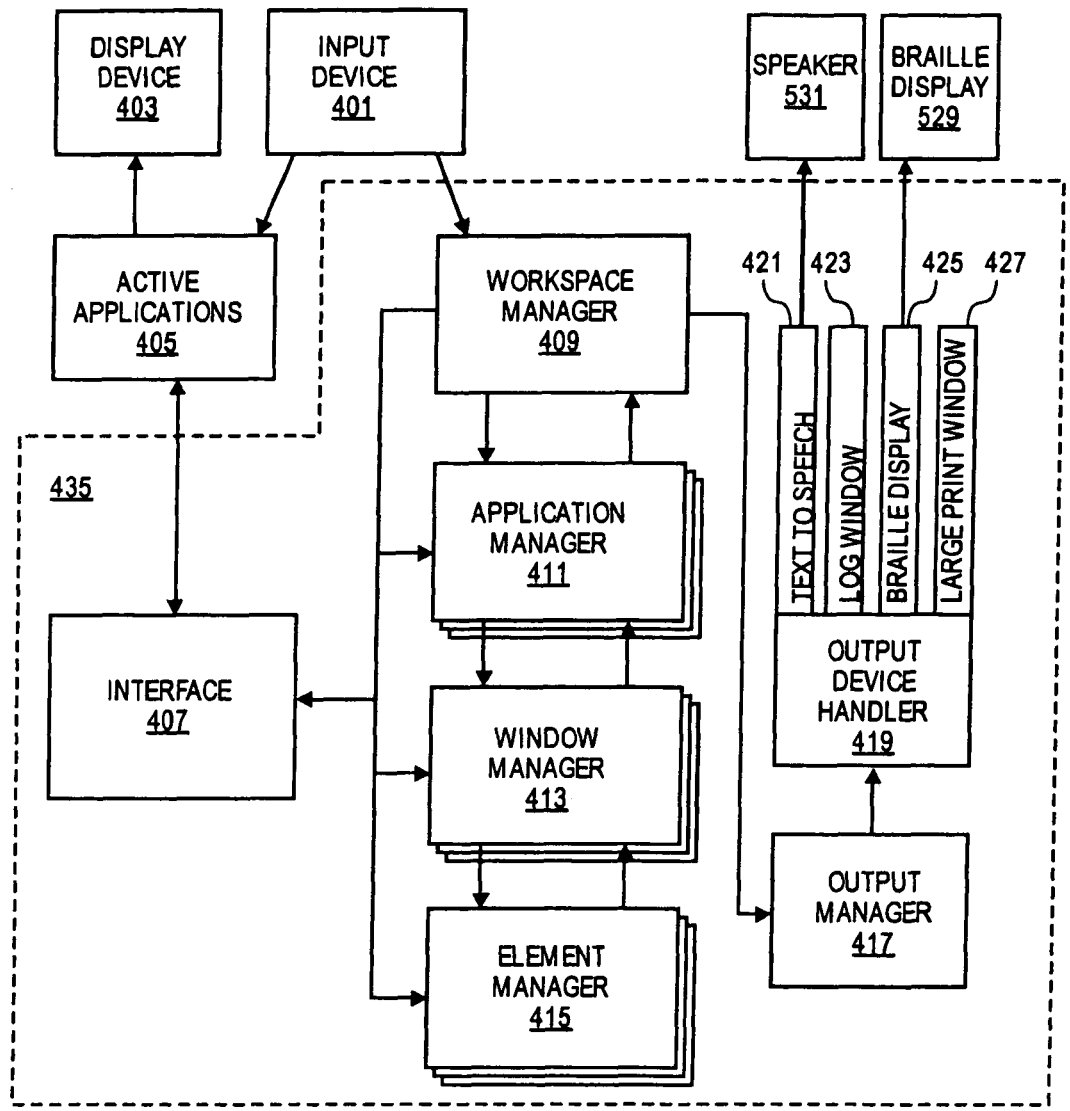
FIG. 4 is a flowchart of one embodiment of the operation of the accessibility service.

FIG. 4 is a diagram of one embodiment of the accessibility service. In one embodiment, the accessibility service may be implemented in an object oriented paradigm. In another embodiment, the accessibility service may be implemented in a procedural, functional or similar paradigm. An embodiment of an object orient implementation is described for sake of convenience. One of ordinary skill would understand that other embodiments utilizing other programming paradigms and techniques may be utilized.

In one embodiment, the accessibility service 409 may be part of the operating system of a computer. An input device 401 may be part of the computer system to allow a user to interact with active applications 405. The input device 401 may be a mouse, keyboard, joystick, microphone, or similar input device. Active applications 405 may be any type of application including, word processing applications, browser applications and similar applications managed by the operating system of the computer. Input received by the operating system from an input device 401 is sent to both the active applications 405 and to the workspace manager 409 of the accessibility service 435. An active application 405 may process the incoming input and update its state, store data, or update its display interface that is output to the display device 403 through the core graphics system or similar graphics system.

In one embodiment, the workspace manager 409 may track each of the applications being executed by the operating system including the currently active application. The workspace manager 409 may analyze the incoming input to determine if it should be forwarded directly to the output manager 417 or if further processing of the input may be required. In one embodiment, the workspace manager 409 is an object having its own thread. In one embodiment, the workspace manager 409 may create an event or results object upon reception of the input data. The event object may be utilized to initiate an analysis of the input data. The input data may be analyzed to determine the type of the input being received. For example, the input data may be keyboard input, including a character key or hot key input, pointer device input, or similar input type. A determination may be made as to which application the input is associated with.

In one embodiment, if the input is character data or similar data that may not require further processing, the input data may be placed in a results object and forwarded to the output manager 417. If the input is a hot key, mouse input or similar input that may indicate that a navigation option has been selected then the input may require further processing. A navigation option may indicate that a user has sent input that requests a change in the current window focus, selected application, that the user has selected a menu, menu option or similar application or operating system interface option or command. The workspace manager 409 may check an application to determine if the input is related to a navigation option or similar function. The workspace manager 409 may track hot keys or similar navigation options for each application or may query the application to determine if the input is a navigation or similar option.

In one embodiment, the workspace manager 409 may utilize an interface 407 to communicate with the active application or other applications to determine if the input corresponds to a navigation option or similar command. In one embodiment, the interface may include an accessibility API, including a concrete implementation of the API in the form of an adaptor or similar implementation. In one embodiment, an additional abstraction layer may be present in the interface to provide a standard interface if multiple adapter implementations may be present in the system. The interface 407 provides a set of functions, classes, methods, utilities or similar programs to allow the accessibility program to communicate with applications being executed by the operating system.

In one embodiment, if the workspace manager 409 is able to resolve the input completely, it may record the resolution and context information in a result object sent to the output manager 417. Resolving an input may include effecting a navigation option, e.g., changing a focused window, confirming input, repositioning the accessibility cursor, recording input and context to be output and similar actions. Resolving an input may include providing the accessibility tools to a user including the slide adjustable tool and smart menu tool. Providing accessibility tools may include communication with the core graphics system to draw the tools to the display device 403.

In one embodiment, an application manager object 411 may track all windows or each of the windows associated with a particular application. In one embodiment, each application executed by the operating system has a corresponding application manager 411. In one embodiment, the application manager 411 may work in conjunction with the workspace manager 409 to determine if there is a corresponding hot key or similar navigation input at the application level. The application manager 411 may primarily resolve navigation options related to window related navigation options such as switching windows in a single application. If the application manager 411 finds a mapping for the input, the appropriate response data may be placed in the results object which may then be returned to the output manager 417. The application manager 411 may query applications using the interface 407.

In one embodiment, each application manager 411 may be executed with a separate thread. The multithreaded processing of events prevents the lock up of navigation for all applications if the application manager 411 for one application encounters a fatal error. This improves the robustness of the accessibility service and minimizes the potential for a user to be stranded while utilizing applications run by the operating system. If an application manager 411 encounters a fatal error, it may be restarted without adversely affecting the accessibility of other applications. The accessibility service may auto restart any application manager or similar component including a workspace manager when it encounters a fatal error to ensure that a user is not left without accessibility services in any context.

In one embodiment, if the application manager 411 and workspace manager 409 are not capable of completely resolving an input, then the event or result object may be passed to a window manager 413. The window manager 413 may track elements associated with a particular window. The event or result object may be passed to a particular window manager 413 based on its association with the currently focused window or similar criteria. The window manager 413 may resolve hot keys and similar input associated with particular elements of a window. An element may be a particular menu, button, text field or similar component of a window. The window manager 413 may build or maintain an element map for tracking the elements of a window. The window manager 413 may communicate through interface 407 with the applications to resolve the input or pass the input to an element manager 415.

In one embodiment, the event or result object may be passed to the current active element manager 415 or other element manager. The element manager 415 seeks to resolve the input such as determining a hot key functionality. Elements may contain nested elements and if a particular element manager 415 is unable to completely resolve the input then the event or result object may be forwarded to the manager of nested elements until the input is completely resolved. In one embodiment, the process of resolving the input is a recursive process. The event and results object may be passed to the lowest nested element before being checked to be resolved. The results object and event object may be passed back up the chain to be progressively resolved. Once the input is completely resolved the results object may be returned to the output manager 417. The element managers may communicate through interface 407 with the applications to obtain information by querying the application.

In one embodiment, the output manager 417 handles result objects and provides the resolution of input stored in the results object to output device handler 419. The output device handler 419 and the devices may operate as separate processes from the accessibility service. The result object may contain information added at different levels of the chain of analysis (i.e., the workspace manager down to the element manager). For example, the workspace manager may be responsible for echoing keys and may add echo string in to the search result. If a user types cntrl-right-arrow the workspace manager may place a "move right" indicator into the result object before passing the result object on for further processing. The window object may subsequently perform the actual move to the new element adding its description to the result object. The final result object sent to the object manager 407 may contain "move right" and element name field.

In one embodiment, the output device handler 419 may pass the result information to each of the output devices or may selectively send the result information to output devices based on the type of data the result contains. Output devices may include a text-to-speech program 421 that converts the output result information to a signal to a speaker 431, a log window 423, Braille display program 425 to operate a refreshable Braille display 429, a large print window generator 427 and similar output programs and devices. The output device handler 419 may be modular and output devices may be added to and removed from the handler. A user may configure how output is handled. A user may designate certain types of result data to handled by certain devices or to be ignored. For example, the "move right" information in the result may be provided audibly to a user through the text-to-speech 321 outlet and the element name field may be provided to a user through the refreshable Braille display 429.

Figure 5:
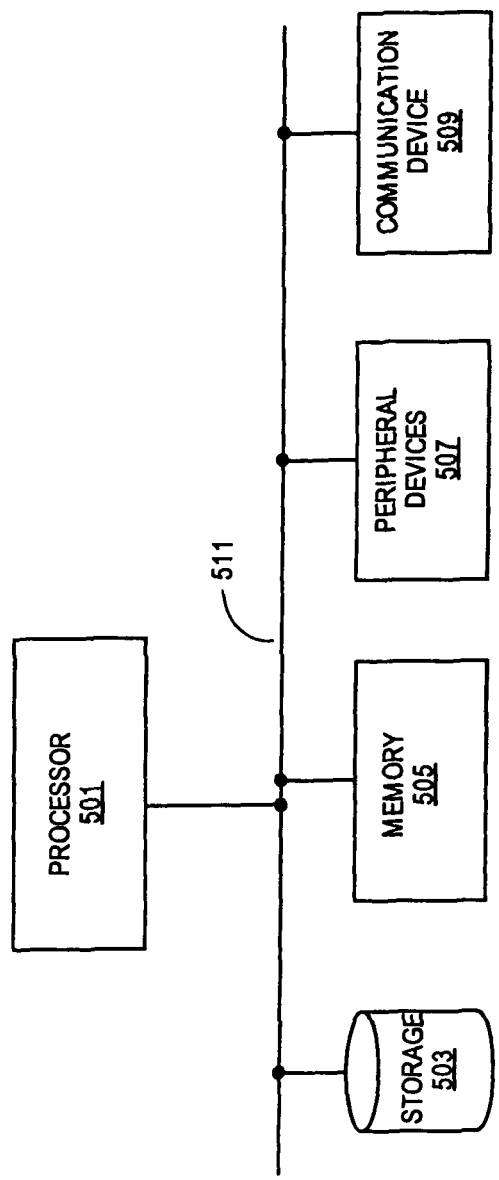
FIG. 5 is a diagram of a computer system for executing one embodiment of the accessibility service.

FIG. 5 is a diagram of one embodiment of a computer system for implementing the accessibility service. In one embodiment, the computer system may include a processor 501 or set of processors to execute the operating system, applications, services and similar programs. The processor may be a general purpose processor, application specific integrated circuit (ASIC) or similar processor. Processor 501 may be in communication via a bus 511 or similar communication medium with a memory device 505. Memory device 505 may be a system memory device or set of devices such as double data rate (DDR) memory modules, synchronized dynamic random access memory (SDRAM) memory modules, flash memory modules, or similar memory devices. Memory device 505 may be utilized by processor 501 as a working memory to execute the operating system, services, applications, file handling system and similar programs.

In one embodiment, the computer system may include a storage device 503. Storage device 503 may be a magnetic disk, optical storage medium, flash memory, or similar storage device. Storage device 503 may be utilized to store the operating system and services such as the accessibility service. Storage device 503 may organize components in a file system. Stored components may include program files, operating system and services files, file handling system files, class files, temporary files and similar files and data structures. The computer system may also include a set of peripheral devices 507. Peripheral devices 507 may include input devices, sound system devices, graphics devices, display devices, auxiliary storage devices, refreshable Braille display devices or similar devices or systems utilized with a computer system.

In one embodiment, the computer system may include a communication device 509. Communication device 509 may be a networking device to allow the computer system, operating system, applications, services and similar programs to communicate with other computers, applications, services and similar programs. In one embodiment, communication device 509 may be utilized to communicate with a remote database and retrieve or receive updates for the operating system and services from the database.

In one embodiment, the operating system and accessibility service may be implemented in software and stored or transmitted in a machine-readable medium. As used herein, a machine-readable medium is a medium that can store or transmit data such as a fixed disk, physical disk, optical disk, CDROM, DVD, floppy disk, magnetic disk, wireless device, infrared device, and similar storage and transmission technologies.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method, comprising:
at a computing device with a display:
providing a plurality of user interface objects on a desktop, the plurality of user interface objects including an active application window and a first user interface object that is completely visually obscured by the active application window;
providing a pointer cursor and an accessibility cursor that is distinct from the pointer cursor;
while the first user interface object is completely visually obscured by the active application window, detecting a user input accessing the first user interface object with the accessibility cursor, independently of the pointer cursor; and
while the accessibility cursor is accessing the first user interface object, visually revealing the first user interface element from behind the active application window.

2. The method of claim 1, wherein visually revealing the first user interface element from behind the active application window is temporary.

3. The method of claim 2, wherein temporarily revealing the visual appearance of the first user interface element that is hidden behind the active application window lasts for a duration that a predetermined keyboard input is maintained by a user.

4. The method of claim 2, wherein temporarily revealing the visual appearance of the first user interface element that is hidden behind the active application window includes temporarily presenting a magnified view of the first user interface element over the active application window.

5. The method of claim 1, further comprising:
while the accessibility cursor is accessing the first user interface object, providing an audible description of the first user interface element.

6. The method of claim 1, wherein the user input accessing the first user interface object with the accessibility cursor is a user input that moves the accessibility cursor within one or more background applications.

7. A computing device, comprising:
a display;
one or more processors;
memory; and
one or more programs, wherein the one or more programs are stored in the memory and configured to be executed by the one or more processors, the one or more programs including instructions for:
providing a plurality of user interface objects on a desktop, the plurality of user interface objects including an active application window and a first user interface object that is completely visually obscured by the active application window;
providing a pointer cursor and an accessibility cursor that is distinct from the pointer cursor;
while the first user interface object is completely visually obscured by the active application window, detecting a user input accessing the first user interface object with the accessibility cursor, independently of the pointer cursor; and
while the accessibility cursor is accessing the first user interface object, visually revealing the first user interface element from behind the active application window.

8. The device of claim 7, wherein visually revealing the first user interface element from behind the active application window is temporary.

9. The device of claim 8, wherein temporarily revealing the visual appearance of the first user interface element that is hidden behind the active application window lasts for a duration that a predetermined keyboard input is maintained by a user.

10. The device of claim 8, wherein temporarily revealing the visual appearance of the first user interface element that is hidden behind the active application window includes temporarily presenting a magnified view of the first user interface element over the active application window.

11. The device of claim 7, wherein the one or more programs further include instructions for:
while the accessibility cursor is accessing the first user interface object, providing an audible description of the first user interface element.

12. The device of claim 7, wherein the user input accessing the first user interface object with the accessibility cursor is a user input that moves the accessibility cursor within one or more background applications.

13. A non-transitory computer readable medium having stored therein instructions, which when executed by a device with a touch screen display, cause the device to:
provide a plurality of user interface objects on a desktop, the plurality of user interface objects including an active application window and a first user interface object that is completely visually obscured by the active application window;
provide a pointer cursor and an accessibility cursor that is distinct from the pointer cursor;
while the first user interface object is completely visually obscured by the active application window, detect a user input accessing the first user interface object with the accessibility cursor, independently of the pointer cursor; and
while the accessibility cursor is accessing the first user interface object, visually reveal the first user interface element from behind the active application window.

14. The non-transitory computer readable medium of claim 13, wherein visually revealing the first user interface element from behind the active application window is temporary.

15. The non-transitory computer readable medium of claim 14, wherein temporarily revealing the visual appearance of the first user interface element that is hidden behind the active application window lasts for a duration that a predetermined keyboard input is maintained by a user.

16. The non-transitory computer readable medium of claim 14, wherein temporarily revealing the visual appearance of the first user interface element that is hidden behind the active application window includes temporarily presenting a magnified view of the first user interface element over the active application window.

17. The non-transitory computer readable medium of claim 13, wherein the instructions further cause the device to:
while the accessibility cursor is accessing the first user interface object, provide an audible description of the first user interface element.

18. The non-transitory computer readable medium of claim 13, wherein the user input accessing the first user interface object with the accessibility cursor is a user input that moves the accessibility cursor within one or more background applications.

19. A graphical user interface on a computing device with a touch screen display, comprising:
a desktop;
a plurality of user interface objects provided on the desktop, the plurality of user interface objects including an active application window and a first user interface object that is completely visually obscured by the active application window;
a pointer cursor; and
an accessibility cursor that is distinct from the pointer cursor, wherein:
while the first user interface object is completely visually obscured by the active application window, a user input accessing the first user interface object with the accessibility cursor independently of the pointer cursor is detected; and
while the accessibility cursor is accessing the first user interface object, the first user interface element is visually revealed from behind the active application window.

\* \* \* \* \*

UNITED STATES PATENT AND TRADEMARK OFFICE
CERTIFICATE OF CORRECTION

PATENT NO. : 8,744,852 B1
APPLICATION NO. : 11/643389
DATED : June 3, 2014
INVENTOR(S) : Eric T. Seymour et al.

It is certified that error appears in the above-identified patent and that said Letters Patent is hereby corrected as shown below:

On the Title Page

UNDER "OTHER PUBLICATIONS":

On page 2, in column 2, line 2, delete "htt:" and insert -- http: --, therefor;
On page 2, in column 2, line 20, delete ""Browing" and insert -- "Browsing --, therefor;
On page 3, in column 1, line 18, delete "Fisheeye" and insert -- Fisheye --, therefor;
On page 3, in column 1, line 49, delete "Vancoucer," and insert -- Vancouver, --, therefor;
On page 3, in column 1, line 61, delete "(INFOIVS" and insert -- (INFOVIS --, therefor;
On page 3, in column 2, lines 44-45, delete "Compueters" and insert -- Computers --, therefor;
On page 4, in column 1, line 5, delete "Perfomance" and insert -- Performance --, therefor;
On page 4, in column 1, line 13, delete "Interantional" and insert -- International --, therefor;
On page 4, in column 1, line 22, delete "Visualizatioin" and insert -- Visualization --, therefor;
On page 4, in column 1, line 26, delete "Toold" and insert -- Tools --, therefor;
On page 4, in column 1, line 31, delete "SIGHI" and insert -- SIGCHI --, therefor.

Signed and Sealed this
Twenty-second Day of September, 2015

Michelle K. Lee
*Director of the United States Patent and Trademark Office*